US010882450B2

(12) United States Patent
Maejima et al.

(10) Patent No.: US 10,882,450 B2
(45) Date of Patent: Jan. 5, 2021

(54) VEHICLE PERIPHERY MONITORING APPARATUS

(71) Applicants: TOYOTA JIDOSHA KABUSHIKI KAISHA, Toyota (JP); DENSO TEN LIMITED, Kobe (JP)

(72) Inventors: Kohei Maejima, Nisshin (JP); Atsutoshi Sakaguchi, Toyota (JP); Yamato Yorifuji, Toyota (JP); Masahiro Takahashi, Toyota (JP); Yukiko Hatakeyama, Kobe (JP); Kouei Kiyo, Kobe (JP); Tomoyuki Sato, Kobe (JP)

(73) Assignees: TOYOTA JIDOSHA KABUSHIKI KAISHA, Toyota (JP); DENSO TEN Limited, Kobe (JP)

( * ) Notice: Subject to any disclaimer, the term of this patent is extended or adjusted under 35 U.S.C. 154(b) by 0 days.

(21) Appl. No.: 15/833,573

(22) Filed: Dec. 6, 2017

(65) Prior Publication Data
US 2018/0170259 A1 Jun. 21, 2018

(30) Foreign Application Priority Data
Dec. 21, 2016 (JP) .................................. 2016-248377

(51) Int. Cl.
*B60R 1/00* (2006.01)
*H04N 5/232* (2006.01)
(Continued)

(52) U.S. Cl.
CPC ........... *B60R 1/00* (2013.01); *H04N 5/23293* (2013.01); *H04N 7/181* (2013.01);
(Continued)

(58) Field of Classification Search
CPC .............. B60R 1/00; B60R 2300/8066; B60R 2300/105; B60R 2300/802;
(Continued)

(56) References Cited

U.S. PATENT DOCUMENTS

2001/0030688 A1* 10/2001 Asahi .................... B60Q 9/005
348/118
2003/0114970 A1* 6/2003 Hara ...................... B62D 5/008
701/41
(Continued)

FOREIGN PATENT DOCUMENTS

CN 102448773 A 5/2012
CN 102474597 A 5/2012
(Continued)

*Primary Examiner* — Anner N Holder
*Assistant Examiner* — Jill D Sechser
(74) *Attorney, Agent, or Firm* — Oliff PLC

(57) ABSTRACT

A vehicle periphery monitoring apparatus includes a camera, an electronic control unit and a display unit configured to display the display image. The ECU is configured to generate a display image of an external environment based on image information from the camera such that the display image includes a first display image from a first predetermined viewpoint from which one of right and left side surfaces of a host vehicle and a rear portion or a front portion of the host vehicle are obliquely seen from above. The ECU is configured to generate and output the display image including the first display image in at least any one of a predetermined first traveling status of the host vehicle, a predetermined periphery status of the area on either side of the host vehicle, and a state in which a turn signal lever is manipulated.

7 Claims, 6 Drawing Sheets

(51) Int. Cl.
*H04N 7/18* (2006.01)
*H04N 13/243* (2018.01)

(52) U.S. Cl.
CPC ... *B60R 2300/105* (2013.01); *B60R 2300/607* (2013.01); *B60R 2300/70* (2013.01); *B60R 2300/802* (2013.01); *B60R 2300/8066* (2013.01); *H04N 13/243* (2018.05)

(58) Field of Classification Search
CPC .......... B60R 2300/607; B60R 2300/70; H04N 7/181; H04N 5/23293; H04N 13/243
See application file for complete search history.

(56) References Cited

U.S. PATENT DOCUMENTS

| | | | |
|---|---|---|---|
| 2007/0206835 A1* | 9/2007 | Abe | H04N 7/181 382/104 |
| 2010/0070139 A1* | 3/2010 | Ohshima | B60R 1/00 701/42 |
| 2010/0245577 A1* | 9/2010 | Yamamoto | B60R 1/00 348/148 |
| 2011/0018991 A1 | 1/2011 | Watanabe et al. | |
| 2011/0032357 A1 | 2/2011 | Kitaura et al. | |
| 2012/0069187 A1 | 3/2012 | Ozaki et al. | |
| 2012/0127312 A1 | 5/2012 | Nagamine et al. | |
| 2013/0010117 A1 | 1/2013 | Miyoshi et al. | |
| 2013/0120578 A1* | 5/2013 | Iga | B60R 1/00 348/148 |
| 2014/0354816 A1* | 12/2014 | Inanobe | B60R 1/00 348/148 |
| 2016/0152264 A1 | 6/2016 | Watanabe et al. | |
| 2016/0193983 A1* | 7/2016 | Sawada | B60R 25/31 348/148 |
| 2016/0203377 A1 | 7/2016 | Irie et al. | |

FOREIGN PATENT DOCUMENTS

| | | |
|---|---|---|
| CN | 105644438 A | 6/2016 |
| EP | 2 464 113 A1 | 6/2012 |
| EP | 3 025 934 A1 | 6/2016 |
| JP | 2002-109697 A | 4/2002 |
| JP | 2008-213646 A | 9/2008 |
| JP | 2009-278349 A | 11/2009 |
| JP | 2010-274813 A | 12/2010 |
| JP | 2011-055480 | 3/2011 |
| JP | 2011-205514 A | 10/2011 |
| JP | 2012-217000 A | 11/2012 |
| JP | 2015-202769 A | 11/2015 |
| WO | 2009/144994 A1 | 12/2009 |
| WO | 2015/159142 A1 | 10/2015 |

* cited by examiner

VEHICLE PERIPHERY MONITORING APPARATUS

INCORPORATION BY REFERENCE

The disclosure of Japanese Patent Application No. 2016-248377 filed on Dec. 21, 2016 including the specification, drawings and abstract is incorporated herein by reference in its entirety.

BACKGROUND

1. Technical Field

The disclosure relates to a vehicle periphery monitoring apparatus.

2. Description of Related Art

A technique of generating a composite image of an external environment of a vehicle periphery, based on image information from a camera that images the external environment of the vehicle periphery, and of outputting the generated composite image to a display unit has been known (for example, refer to Japanese Unexamined Patent Application Publication No. 2012-217000 (JP 2012-217000 A)).

SUMMARY

However, in such a related art, a display image by which an occupant more easily recognizes an area on either side of the host vehicle is not output at the appropriate occasion, and thus there is room for improvement in driving assistance. For example, an overhead image in which a host vehicle is seen substantially from above, is useful for an occupant to recognize the overall vehicle periphery. However, when an occupant recognizes a local range among the vehicle periphery, for example, the area on either side of the host vehicle, the usefulness of the overhead image is slightly lowered. Depending on the occupant, there is an occasion in which it is more useful to recognize the area on either side of the host vehicle than to recognize the overall vehicle periphery (an occasion where a so-called vehicle side checking, which is checking for possibility of collision accident during left-turning or right-turning, is needed)

The disclosure provides a vehicle periphery monitoring apparatus which can output a display image by which an occupant more easily recognizes the area on either side of the host vehicle, at an appropriate occasion.

An aspect of the disclosure relates to a vehicle periphery monitoring apparatus. The vehicle periphery monitoring apparatus includes a camera configured to image an external environment of a vehicle periphery; an electronic control unit configured to generate a display image of the external environment based on image information from the camera; and a display unit configured to display the display image. The electronic control unit is configured to generate the display image such that the display image includes a first display image from a first predetermined viewpoint from which one of right and left side surfaces of a host vehicle and a rear portion or a front portion of the host vehicle are obliquely seen from above. The electronic control unit is configured to generate and output the display image including the first display image in at least any one of a predetermined first traveling status of the host vehicle, a predetermined periphery status of an area on either side of the host vehicle, and a state in which a turn signal lever is manipulated.

According to the aspect of the disclosure, the display image including the first display image for the external environment from the first predetermined viewpoint from which one of right and left side surfaces of the host vehicle and a rear portion or a front portion of the host vehicle are obliquely seen from above is generated, and the generated display image including the first display image is output to the display unit. Since the first predetermined viewpoint is a viewpoint from which one of right and left side surfaces of the host vehicle and a rear portion or a front portion of the host vehicle are obliquely seen from above, the occupant more easily recognizes an area on a side of the host vehicle on the one of right and left side surfaces of the host vehicle. In addition, in at least any one of the predetermined first traveling status of the host vehicle, the predetermined periphery status of the area on either side of the host vehicle, and the manipulated state of the turn signal lever, the display image including the first display image is output, and thus the display image including the first display image can be output at an occasion in which it is useful for the occupant to recognize the area on either side of the host vehicle (for example, an occasion in which checking for possibility of collision accident during left-turning or right-turning is needed). In this manner, it is possible to output a display image by which the occupant more easily recognizes the area on either side of the host vehicle, at an appropriate occasion.

In the aspect of the disclosure, the electronic control unit may be configured to generate and output the display image including the first display image in the first traveling status. The first traveling status may include a steering state in which the magnitude of a steering angle from a neutral position is equal to or greater than a predetermined angle.

According to the aspect of the disclosure, the display image including the first display image can be output when the host vehicle is in a turning state or in a state before turning. When the vehicle is in a turning state or in a state before turning, it is useful for the occupant to recognize the area on either side of the host vehicle, and thus appropriate driving assistance can be implemented. That is, the "state before turning" is a stopped state, and a state in which the magnitude of the steering angle from the neutral position is significantly greater than zero. The "state before turning" occurs due to the vehicle being temporarily stopped during the turning, or the steering without driving of the vehicle.

In the aspect of the disclosure, the first traveling status may further include a vehicle speed state in which a vehicle speed is equal to or less than a predetermined vehicle speed.

According to the aspect of the disclosure, the display image including the first display image can be output in the vehicle speed state in which the vehicle speed is equal to or less than the predetermined vehicle speed. The occasion in which it is useful for the occupant to recognize the area on either side of the host vehicle is that the vehicle is in the state before turning in the stopped state, or the vehicle is in the turning state at a relatively low speed, in many cases, and thus the display image can be output at an appropriate occasion.

In the aspect of the disclosure, the vehicle periphery monitoring apparatus may further include a vehicle speed sensor configured to output vehicle-speed information representing a vehicle speed. The electronic control unit may be configured to determine whether the vehicle speed is equal to or less than the predetermined vehicle speed based on the vehicle-speed information.

In the aspect of the disclosure, the vehicle periphery monitoring apparatus may further include a shift position sensor configured to output shift-position information representing a shift position. The first traveling status may further include a state in which the shift position is in a forward traveling range. The electronic control unit may be configured to generate and output the display image including the first display image from the first predetermined viewpoint from which a side surface on an inner wheel side of the right and left side surfaces of the host vehicle and the rear portion of the host vehicle are obliquely seen from above.

According to the aspect of the disclosure, when the vehicle is in the turning state in the forward traveling state, or is in the state before turning in the stopped state with the shift position being in the forward traveling range, the safety checking for the inner wheel side becomes easy.

In the aspect of the disclosure, the first traveling status may further include a state in which the host vehicle approaches or arrives at a predetermined left turn point or right turn point.

According to the aspect of the disclosure, the display image including the first display image can be output at a predetermined left turn point or right turn point. When the host vehicle is in the turning state or in the state before turning at the right or left turn point, it is useful for the occupant to recognize the area on either side of the host vehicle, and thus appropriate driving assistance can be implemented.

In the aspect of the disclosure, the vehicle periphery monitoring apparatus may further include a distance measuring sensor configured to detect an obstacle present in the area on either side of the host vehicle. The predetermined periphery status may include a state in which the obstacle is detected by the distance measuring sensor. The electronic control unit may be configured to generate and output the display image including the first display image in the predetermined periphery status and the first traveling status.

According to the aspect of the disclosure, when the vehicle is in the turning state or in the state before turning and an obstacle in the area on either side of the host vehicle is detected, it is useful for the occupant to recognize the area on either side of the host vehicle, and thus appropriate driving assistance can be implemented.

In the aspect of the disclosure, the electronic control unit may be configured to generate the display image such that the display image further includes a second display image from a second predetermined viewpoint from which the host vehicle is seen from behind and obliquely from above in a right-left symmetry manner. The electronic control unit may be configured to generate and output the display image including the second display image in a predetermined second traveling status including a straight traveling state.

According to the aspect of the disclosure, in the predetermined second traveling status including straight traveling state, the display image including the second display image by which the occupant more easily recognizes the overall vehicle periphery can be output.

According to the aspect of the disclosure, a vehicle periphery monitoring apparatus which outputs a display image by which an occupant more easily recognizes the area on either side of the host vehicle, at the appropriate occasion can be obtained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments will be described in detail with reference to the accompanying drawings.

Figure 1:
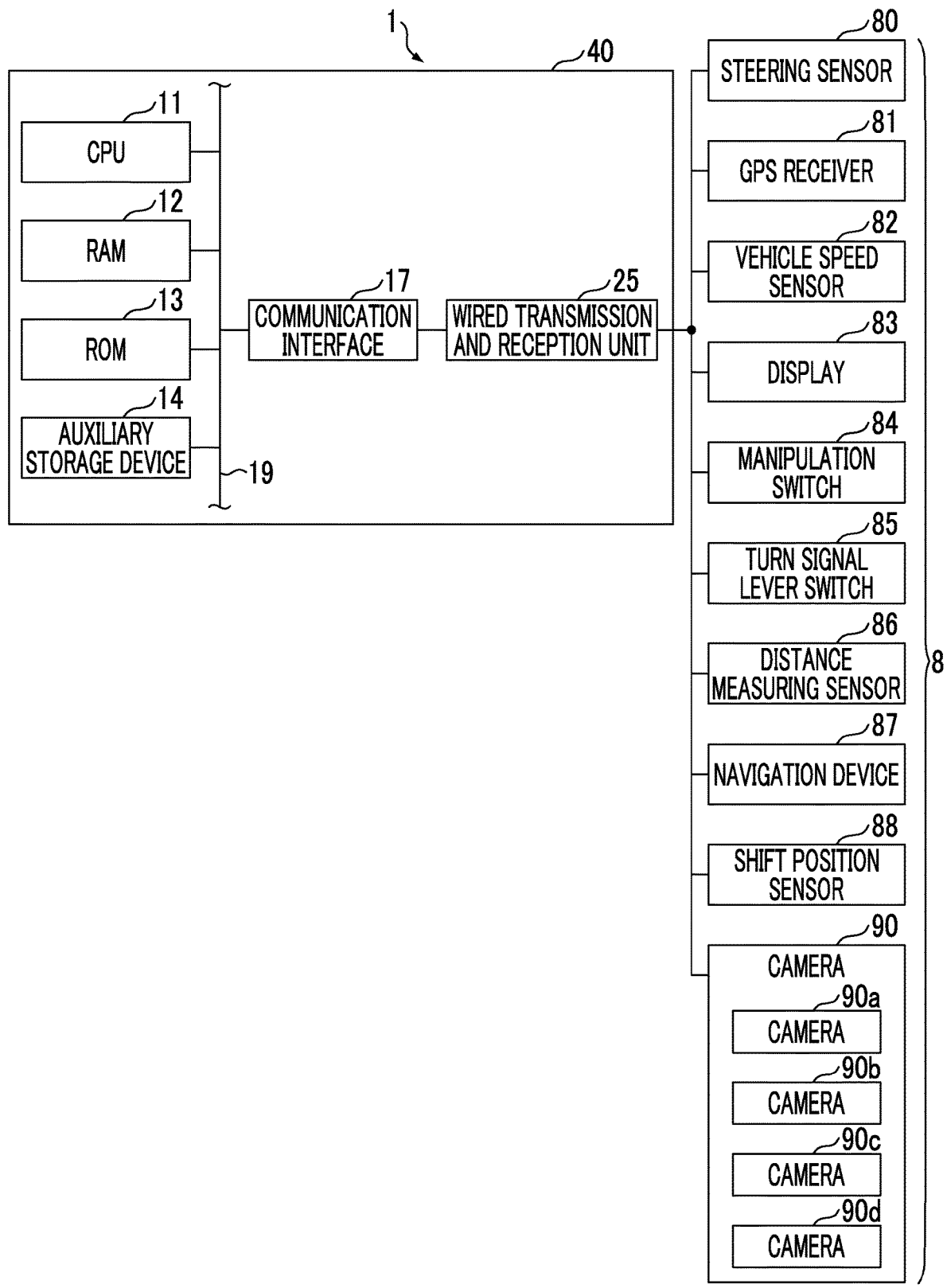
FIG. 1 is a diagram illustrating an example of a configuration of a vehicle periphery monitoring apparatus according to an embodiment.

FIG. 1 is a diagram illustrating an example of a configuration of a vehicle periphery monitoring apparatus 1 according to an embodiment.

The vehicle periphery monitoring apparatus 1 is mounted in a vehicle. The vehicle periphery monitoring apparatus 1 includes a control device 40, and an in-vehicle electronic device group 8. Hereinafter, a vehicle in which the vehicle periphery monitoring apparatus 1 is mounted is referred to as a "host vehicle".

The control device 40 is formed of a computer. For example, the control device 40 is an electronic control unit (ECU). FIG. 1 is a diagram illustrating an example of a hardware configuration of the control device 40. FIG. 1 schematically illustrates the in-vehicle electronic device group 8 in relation to the hardware configuration of the control device 40.

The control device 40 includes a central processing unit (CPU) 11, a random access memory (RAM) 12, a read only memory (ROM) 13, an auxiliary storage device 14, and a communication interface 17 which are connected by a bus 19, and a wired transmission and reception unit 25 connected to the communication interface 17.

The wired transmission and reception unit 25 includes a transmission and reception unit that performs communication by using a vehicle network such as a Controller Area Network (CAN) or a Local Interconnect Network (LIN). The in-vehicle electronic device group 8 is connected to the control device 40 through the wired transmission and reception unit 25. The control device 40 may include a wireless transmission and reception unit (not illustrated) connected to the communication interface 17, in addition to the wired transmission and reception unit 25. In this case, the wireless transmission and reception unit may include a Near Field Communication (NFC) unit, a Bluetooth (registered trademark) communication unit, a Wireless-Fidelity (Wi-Fi) transmission and reception unit, an infrared-ray transmission and reception unit, or the like.

The in-vehicle electronic device group 8 includes a steering sensor 80, a Global Positioning System (GPS) receiver 81, a vehicle speed sensor 82, a display 83 (an example of a display unit), a manipulation switch 84, a turn signal lever switch 85, a distance measuring sensor 86, a navigation device 87, a shift position sensor 88, and a camera 90.

The steering sensor 80 outputs steering-angle information representing a steering angle of a steering wheel. The steering-angle information includes information representing a steering direction (rightward or leftward), and information representing the magnitude of the steering angle from a neutral position.

The GPS receiver 81 measures the position of the host vehicle based on waves from a GPS satellite.

The vehicle speed sensor 82 outputs vehicle-speed information representing a vehicle speed.

The display 83 is a touch-panel type liquid crystal display, for example. The display 83 is disposed at a position at which an occupant of the host vehicle can visually recognize the display. The display 83 is fixed inside the host vehicle, but may be a portable terminal which can be brought into the host vehicle. In this case, the communication between the portable terminal and the control device 40 is performed through the wireless transmission and reception unit (for example, a Bluetooth communication unit).

The manipulation switch 84 is for turning on or off a function of outputting a vehicle side checking screen which will be described later, and is disposed inside the vehicle cabin.

The turn signal lever switch 85 outputs information representing a state of a turn signal lever (not illustrated) (hereinafter, referred to as "turn signal lever information"). For example, the turn signal lever switch 85 outputs an ON signal as the turn signal lever information in a state where the turn signal lever is manipulated (a manipulated state of the turn signal lever). The types of the ON signal include a first ON signal of when the turn signal lever is manipulated upward, and a second ON signal of when the turn signal lever is manipulated downward, for example.

The distance measuring sensor 86 is provided on each of right and left side portions of the host vehicle. The distance measuring sensor 86 transmits ultrasonic waves in an area on either side of the host vehicle, and detects an obstacle based on reflected waves of the ultrasonic waves. In a case where the distance measuring sensor 86 detects an obstacle, the distance measuring sensor 86 outputs information representing that an obstacle is detected (hereinafter, referred to as "obstacle detection information"). The distance measuring sensor 86 can be turned on or off by the occupant.

The navigation device 87 detects the approach or arrival of the host vehicle at a right or left turn point based on positional information of the host vehicle from the GPS receiver 81 and map information stored in advance. For example, in a case where a guide route is set, when a distance of the position of the host vehicle from the right or left turn point (an example of a predetermined right turn point or left turn point) on the guide route is equal to or less than a predetermined distance D0, the navigation device 87 outputs information representing an event in which the host vehicle approaches or arrives at the right or left turn point (hereinafter, referred to as a "right or left turn point arrival trigger"). The predetermined distance D0 is a threshold value for detecting an event in which the host vehicle approaches or arrives at the right or left turn point, is an adaptive value which is adapted depending on the accuracy or the like of the positional information of the host vehicle from the GPS receiver 81, and is 10 m, for example.

In addition, the navigation device 87 detects the approach or arrival of the host vehicle at the right or left turn point that is set by the occupant, based on the positional information of the host vehicle from the GPS receiver 81 and the right or left turn point set in advance by the occupant (an example of a predetermined right turn point or left turn point). When a distance of the position of the host vehicle from the right or left turn point set in advance by the occupant is equal to or less than the predetermined distance D0, the navigation device 87 outputs information representing an event in which the host vehicle approaches or arrives at the corresponding right or left turn point (hereinafter, referred to as a "right or left turn point arrival trigger" without distinction). Hereinafter, the function of outputting the right or left turn point arrival trigger of the navigation device 87 is referred to as a "point arrival trigger outputting function".

The shift position sensor 88 outputs information representing a shift position (hereinafter, referred to as "shift position information").

The camera 90 includes, for example, an imaging device such as a charge-coupled device (CCD) or complementary metal-oxide-semiconductor (CMOS), and is imaging means for imaging the vehicle periphery. The camera 90 includes a camera 90a, a camera 90b, a camera 90c, and a camera 90d which respectively image portions forward, rearward, leftward, and rightward of the host vehicle.

For example, the camera 90a is provided at a central portion of a front grille of the host vehicle, and images a portion forward of the host vehicle. For example, the camera 90b is provided at a central portion of an upper end of a rear window of the host vehicle, and images a portion rearward of the host vehicle. For example, the camera 90c is provided at a lower portion of a left wing mirror of the host vehicle, and images an area on the left side of the host vehicle. For example, the camera 90d is provided at a lower portion of a right wing mirror of the host vehicle, and images an area on the right side of the host vehicle.

Each of the cameras 90a to 90d provides the captured image to the control device 40. The cameras 90a to 90d cooperate in order to image the external environment of the vehicle periphery in all directions of the host vehicle. Here, an example of an imaging range of the camera 90 will be described by using FIG. 2.

Figure 2:
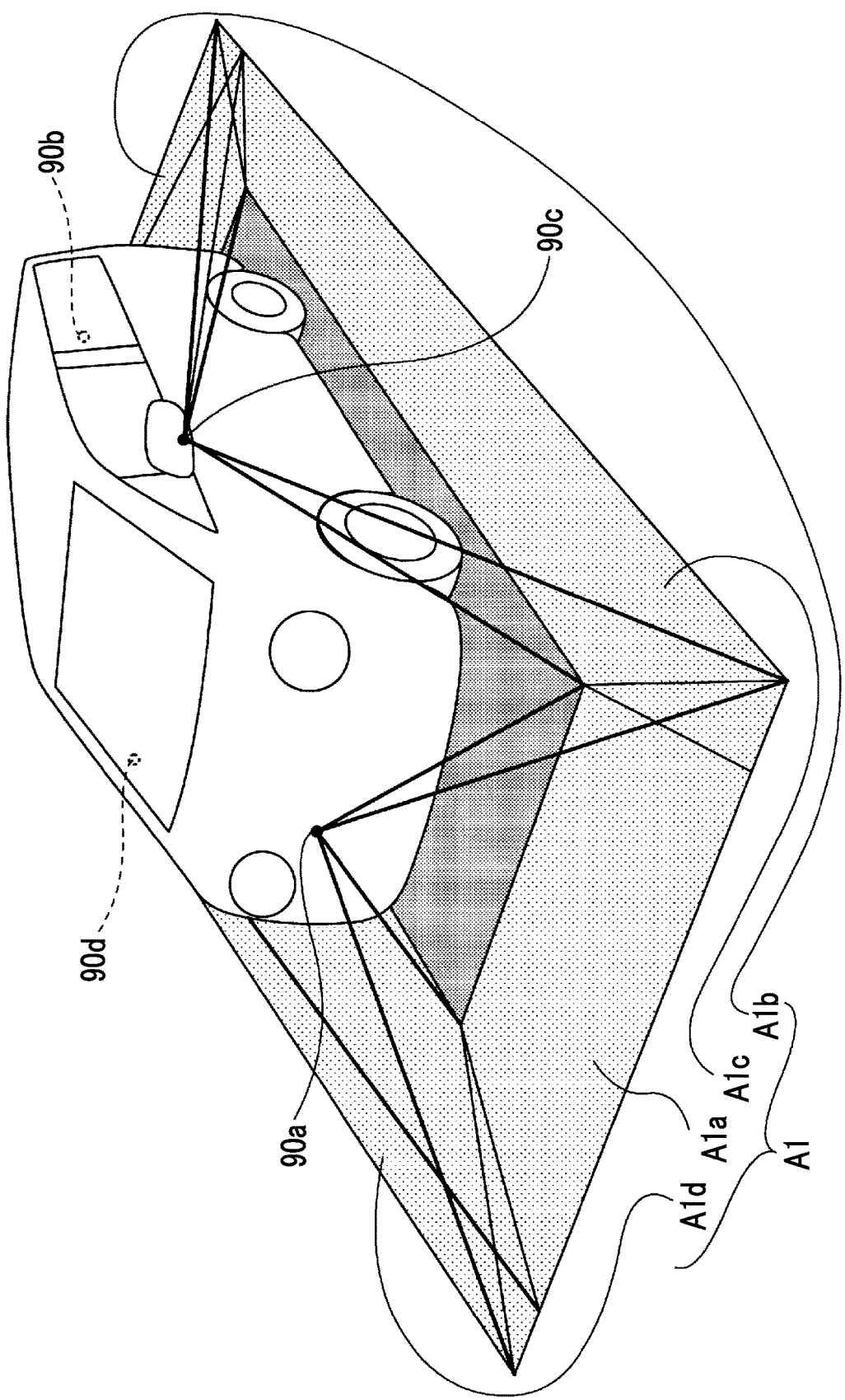
FIG. 2 is a diagram illustrating an example of an imaging range of a camera.

FIG. 2 is a diagram illustrating an example of an imaging range of the camera 90.

In FIG. 2, the cameras 90b, 90d are hidden behind the host vehicle and thus are not visible.

As illustrated in FIG. 2, the cameras 90a to 90d respectively have imaging ranges in which road surface portions A1a to A1d adjacent to portions forward, rearward, leftward, and rightward of the host vehicle can be imaged. Therefore, the cameras 90a to 90d can image the status of the vehicle periphery which cannot be visually recognized by a driver.

In addition, a road surface portion A1 in which the road surface portions A1a to A1d are overlapped surrounds the host vehicle. That is, the camera 90 has an imaging range in which the road surface portion A1 surrounding the host vehicle by 360° can be imaged.

Figure 3:
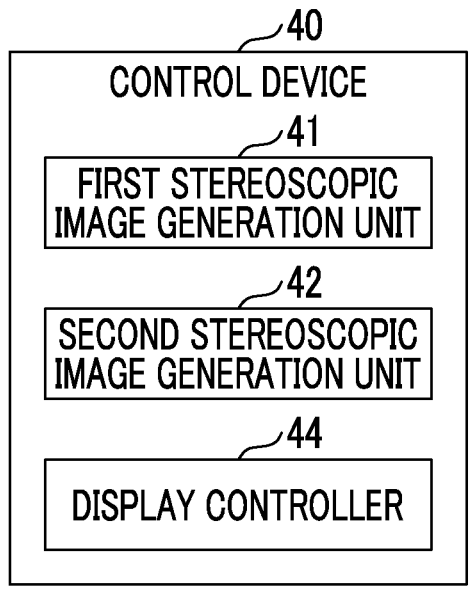
FIG. 3 is a functional block diagram illustrating an example of functions of a control device.

FIG. 3 is a functional block diagram illustrating an example of functions of the control device 40.

The control device 40 generates a composite image based on the captured images received from the cameras 90a to 90d, and generates a display image (a display image for left-turning described below, and the like) to be displayed on the display 83 (refer to FIG. 1), based on the generated composite image. As a method of generating a composite image based on captured images from a plurality of cameras, for example, a method disclosed in JP 2012-217000 A can be used. The control device 40 provides an image signal corresponding to the generated display image to the display 83 so that the display image is displayed on the display 83.

The control device 40 includes a first stereoscopic image generation unit 41, a second stereoscopic image generation unit 42, and a display controller 44. The first stereoscopic image generation unit 41, the second stereoscopic image generation unit 42, and the display controller 44 are implemented by the CPU 11 executing one or more programs in a storage device (for example, the ROM 13).

The first stereoscopic image generation unit 41 generates a display image for left-turning. The display image for left-turning includes an image (a stereoscopic image section for left-turning 50 described below) (an example of a first display image) of the external environment of the vehicle periphery from a viewpoint for left-turning (an example of a first predetermined viewpoint) from which the left side surface and the rear portion of the host vehicle are obliquely seen from above. The viewpoint for left-turning is a viewpoint from which a left rear wheel of the host vehicle (a rear wheel on the inner wheel side during left turning) is seen.

Figure 4A:
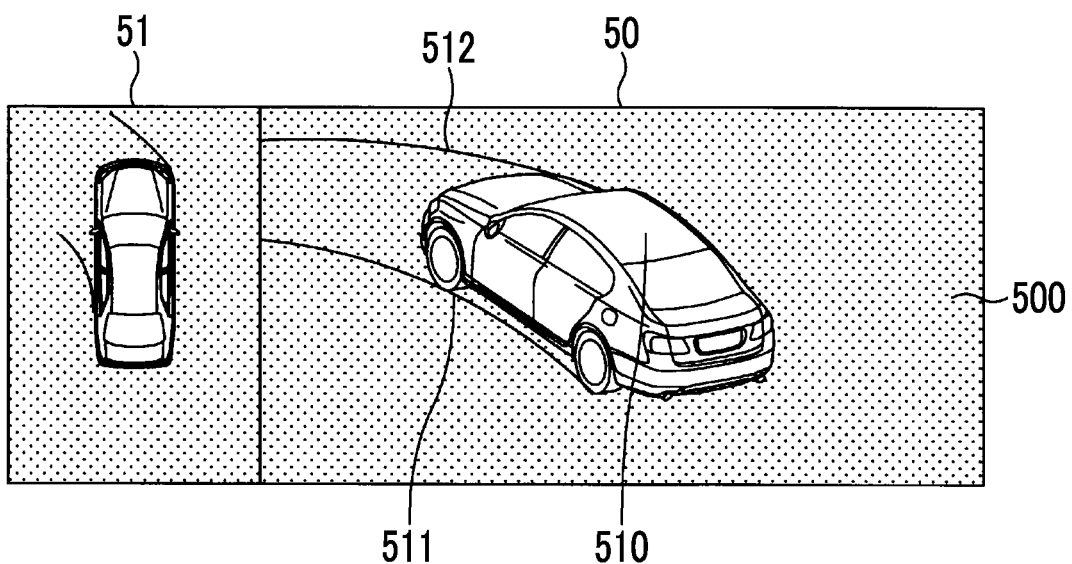
FIG. 4A is a diagram illustrating an example of a display image for left-turning.

FIG. 4A is a diagram illustrating an example of a display image for left-turning.

In the example illustrated in FIG. 4A, the display image for left-turning includes the stereoscopic image section for left-turning 50 (an example of the first display image), and a top-view image section 51.

The stereoscopic image section for left-turning 50 includes a vehicle-periphery image section 500, and a host-vehicle display 510. The vehicle-periphery image section 500 is an image section representing the external environment of the vehicle periphery, and is generated based on the images from the cameras 90a to 90d. The vehicle-periphery image section 500 may be generated based on the images from the cameras 90a to 90d (refer to FIG. 4A), or may be generated based on the images from the cameras 90a, 90b, 90c among the cameras 90a to 90d. For example, the vehicle-periphery image section 500 can be generated by setting a viewpoint of a stereoscopic image to the viewpoint for left-turning, the stereoscopic image being obtained by composing the images from the cameras 90a to 90d. In this manner, the occupant can particularly recognize the status of an area on the left side of the host vehicle (a possibility of having a collision accident during left turning or the like).

The host-vehicle display 510 is an image which is prepared in advance (an image which is not an actual image), and stereoscopically represents the host vehicle seen from a viewpoint for left-turning. Accordingly, the occupant (particularly, the driver) can intuitively recognize the positional relationship between the host vehicle and an object present in the vehicle periphery from the stereoscopic image section for left-turning 50. The host-vehicle display 510 may be displayed such that a right part of the front fender is seen through and a part of the vehicle-periphery image section 500 is seen over the right part of the front fender. In this case, the occupant more easily recognizes the positional relationship between the right part of the front fender and the periphery during left turning, and such a function is useful for a vehicle "passing through" on a narrow road. In addition, the stereoscopic image section for left-turning 50 may further include a display 511 representing a predicted trajectory of the left rear wheel of the host vehicle, and a display 512 representing a predicted trajectory of the right part of the front fender. In this case, the occupant more easily recognizes a predicted relationship between the vehicle periphery and each part.

The top-view image section 51 is an image (overhead image) in which the host vehicle is seen substantially from above. In the example illustrated in FIG. 4A, although the reference numeral is not given, the top-view image section 51 similarly includes a vehicle-periphery image section, a host-vehicle display, a display representing a predicted trajectory of the left rear wheel of the host vehicle, and a display representing a predicted trajectory of the right part of the front fender. The display image for left-turning simultaneously includes the stereoscopic image section for left-turning 50 and the top-view image section 51 which have different viewpoints, and thereby the external environment of the vehicle periphery is more easily recognized in multiple views.

The first stereoscopic image generation unit 41 further generates a display image for right-turning. The display image for right-turning includes an image (a stereoscopic image section for right-turning 60 described below) (an example of the first display image) of the external environment of the vehicle periphery from a viewpoint for right-turning (an example of the first predetermined viewpoint) from which the right side surface and the rear portion of the host vehicle are obliquely seen from above. The viewpoint for right-turning is a viewpoint from which a right rear wheel of the host vehicle (a rear wheel on the inner wheel side during right turning) is seen.

Figure 4B:
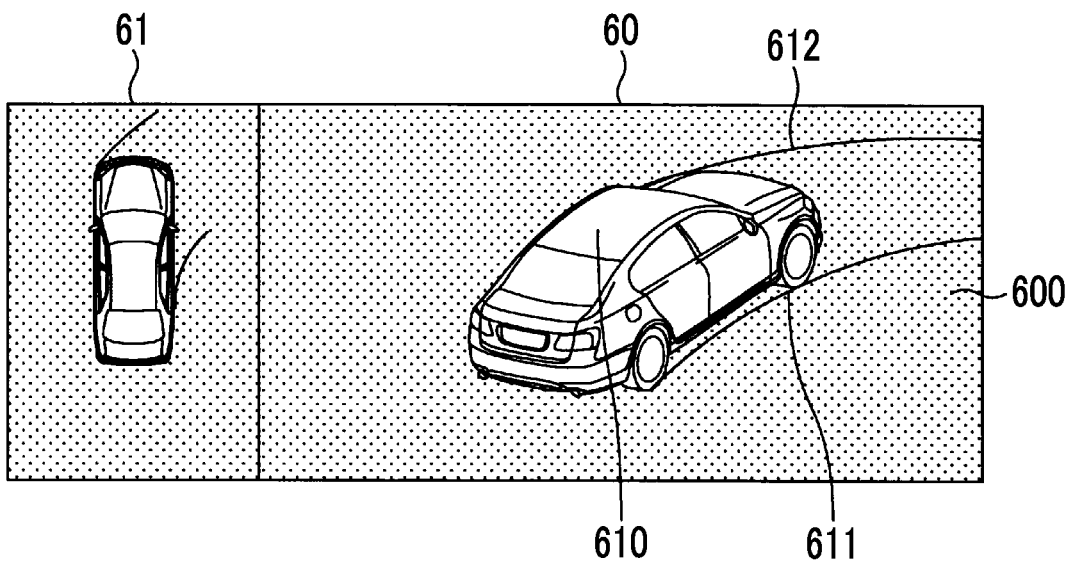
FIG. 4B is a diagram illustrating an example of a display image for right-turning.

FIG. 4B is a diagram illustrating an example of a display image for right-turning.

In the example illustrated in FIG. 4B, the display image for right-turning includes the stereoscopic image section for right-turning 60 (an example of the first display image), and a top-view image section 61.

The stereoscopic image section for right-turning 60 includes a vehicle-periphery image section 600, and a host-vehicle display 610 (an example of an image section relating to the host vehicle). The vehicle-periphery image section 600 is an image section representing the external environment of the vehicle periphery, and is generated based on the images from the cameras 90a to 90d. The vehicle-periphery image section 600 may be generated based on the images from the cameras 90a to 90d (refer to FIG. 4B), or may be generated based on the images from the cameras 90a, 90b, 90d among the cameras 90a to 90d. For example, the vehicle-periphery image section 600 can be generated by setting a viewpoint of a stereoscopic image to the viewpoint for right-turning, the stereoscopic image being obtained by composing the images from the cameras 90a to 90d. In this manner, the occupant can particularly recognize the status of the area on the right side of the host vehicle (a possibility of having a collision accident during right turning or the like).

The host-vehicle display 610 is an image which is prepared in advance (an image which is not an actual image), and stereoscopically represents the host vehicle seen from a viewpoint for right-turning. Accordingly, the occupant (particularly, the driver) can intuitively recognize the positional relationship between the host vehicle and an object present in the vehicle periphery from the stereoscopic image section for right-turning 60. The host-vehicle display 610 may be displayed such that a left part of the front fender is seen through and a part of the vehicle-periphery image section 600 is seen over the left part of the front fender. In this case, the occupant more easily recognizes the relationship between the left part of the front fender and the periphery during right turning. In addition, the stereoscopic image section for right-turning 60 may further include a display 611 representing a predicted trajectory of the right rear wheel of the host vehicle, a display 612 representing a predicted trajectory of the left part of the front fender. In this case, the occupant more easily recognizes a predicted relationship between the vehicle periphery and each part.

The top-view image section 61 is an image in which the host vehicle is seen substantially from above. In the example illustrated in FIG. 4B, although the reference numeral is not given, the top-view image section 61 similarly includes a vehicle-periphery image section, a host-vehicle display, a display representing a predicted trajectory of the right rear wheel of the host vehicle, and a display representing a predicted trajectory of the left part of the front fender. The display image for right-turning simultaneously includes the stereoscopic image section for right-turning 60 and the top-view image section 61 which have different viewpoints, and thereby the external environment of the vehicle periphery is more easily recognized in multiple views.

The second stereoscopic image generation unit 42 generates a display image for straight-traveling. The display image for straight-traveling includes an image (a stereoscopic image section for straight-traveling 70 described below) (an example of a second display image) of the external environment of the vehicle periphery from a viewpoint for straight-traveling (an example of a second predetermined viewpoint) from which the host vehicle is seen from behind and obliquely from above in a right-left symmetry manner. The term "right-left symmetry" indicates a state in which the sight direction of the viewpoint for straight-traveling joins the front-rear axis of the host vehicle.

Figure 4C:
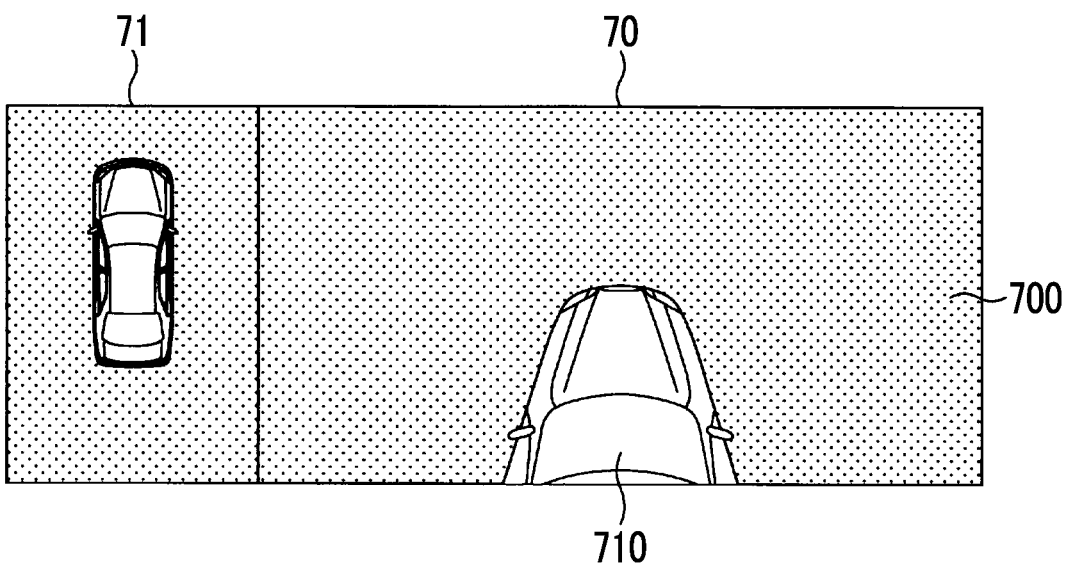
FIG. 4C is a diagram illustrating an example of a display image for straight-traveling.

FIG. 4C is a diagram illustrating an example of a display image for straight-traveling.

In the example illustrated in FIG. 4C, the display image for straight-traveling includes the stereoscopic image section for straight-traveling 70 (an example of the second display image), and a top-view image section 71.

The stereoscopic image section for straight-traveling 70 includes a vehicle-periphery image section 700, and a host-vehicle display 710. The vehicle-periphery image section 700 is an image section representing the external environment of the vehicle periphery, and is generated based on the images from the cameras 90a, 90c, 90d among the cameras 90a to 90d. For example, the vehicle-periphery image section 700 can be generated by setting a viewpoint of a stereoscopic image to the viewpoint for straight-traveling, the stereoscopic image being obtained by composing the images from the cameras 90a, 90c, 90d. In this manner, the occupant can equally recognize the status of portions leftward and rightward of the host vehicle.

The host-vehicle display 710 is an image which is prepared in advance (an image which is not an actual image), and stereoscopically represents the host vehicle seen from a viewpoint for straight-traveling. Accordingly, the occupant (particularly, the driver) can intuitively recognize the positional relationship between the host vehicle and an object present in the vehicle periphery from the stereoscopic image section for straight-traveling 70.

The top-view image section 71 is an image in which the host vehicle is seen substantially from above. In the example illustrated in FIG. 4C, although the reference numeral is not given, the top-view image section 71 similarly includes a vehicle-periphery image section, and a host-vehicle display. The display image for straight-traveling simultaneously includes the stereoscopic image section for straight-traveling 70 and the top-view image section 71 which have different viewpoints, and thereby the external environment of the vehicle periphery is more easily recognized in multiple views.

In the examples illustrated in FIGS. 4A to 4C, the display image for left-turning, the display image for right-turning, and the display image for straight-traveling respectively include the top-view image sections 51, 61, 71, but the top-view image sections 51, 61, 71 may not be provided.

In the embodiment, as an example, the display controller 44 outputs the display image for left-turning or the display image for right-turning in a predetermined traveling status (an example of a predetermined first traveling status) in which usefulness of the safety checking for the area on either side of the host vehicle by the driver is assumed to be relatively high. Here, the term "traveling status" is a concept including not only a status in which the vehicle is traveling, but also a status in which the vehicle is stopped. In addition, the "traveling status" includes a status relating to a "curve", and a status relating to a relationship between the right or left turn point described below and the position of the host vehicle. The traveling status can be determined based on the steering sensor 80, the vehicle speed sensor 82, the GPS receiver 81, and the like.

In the embodiment, as an example, the predetermined traveling status includes the right or left turning state and the state before turning, and more specifically, includes a steering state in which the magnitude of the steering angle from the neutral position is equal to or greater than a predetermined angle S1. In addition, in the embodiment, as an example, the predetermined traveling status includes a combination of the steering state in which the magnitude of the steering angle from the neutral position is equal to or greater than the predetermined angle S1, and another traveling status (for example, refer to Condition 1 or the like described below).

Here, the term "turning" includes not only turning in which the radius of curvature is constant, but also turning in which the radius of curvature changes. In addition, the right or left turn accompanies the turning. The "state before turning" indicates a stopped state, and a state in which a vehicle turns when the vehicle starts to travel from the stopped state. That is, the "state before turning" is a state in which the magnitude of the steering angle from the neutral position is significantly greater than zero at a stopped state. The "state before turning" occurs due to the vehicle being temporarily stopped during the turning, or the steering without driving of the vehicle. The predetermined angle S1 is a threshold value for detecting the turning state or the state before turning for which the vehicle side checking or the like is needed, and for example, is about 160 degrees to 200 degrees.

In the embodiment, as an example, in a case where the traveling status is a right turning state or a state before right turning, the display controller 44 outputs the display image for right-turning to the display 83; in a case where the traveling status is a left turning state or a state before left turning, the display controller 44 outputs the display image for left-turning to the display 83; and in a case where the traveling status is straight traveling (an example of a predetermined second traveling status), the display controller 44 outputs the display image for straight-traveling to the display 83. In this case, the display controller 44 determines that the traveling status is a right turning state or a state before right turning when the rotation direction of the steering wheel from the neutral position is a right direction, and determines that the traveling status is a left turning state or a state before left turning when the rotation direction of the steering wheel from the neutral position is a left direction.

With the vehicle periphery monitoring apparatus 1 according to the embodiment, in the right turning state or the state before right turning, the display image for right-turning is output to the display 83, and therefore, the occupant can check the safety of the inner wheel side by looking at the display image for right-turning. That is, the occupant can more easily determine a possibility of having a collision accident during right-turning from the display image for right-turning, and can receive useful driving assistance from the vehicle periphery monitoring apparatus 1.

Similarly, in the left turning state or the state before left turning, the display image for left-turning is output to the display 83, and therefore, the occupant can check the safety of the inner wheel side by looking at the display image for left-turning. That is, the occupant can more easily determine a possibility of having a collision accident during left-turning from the display image for left-turning, and can receive useful driving assistance from the vehicle periphery monitoring apparatus 1.

Next, an operation example of the control device 40 will be described with reference to FIG. 5 and the drawings subsequent to FIG. 5.

Figure 5:
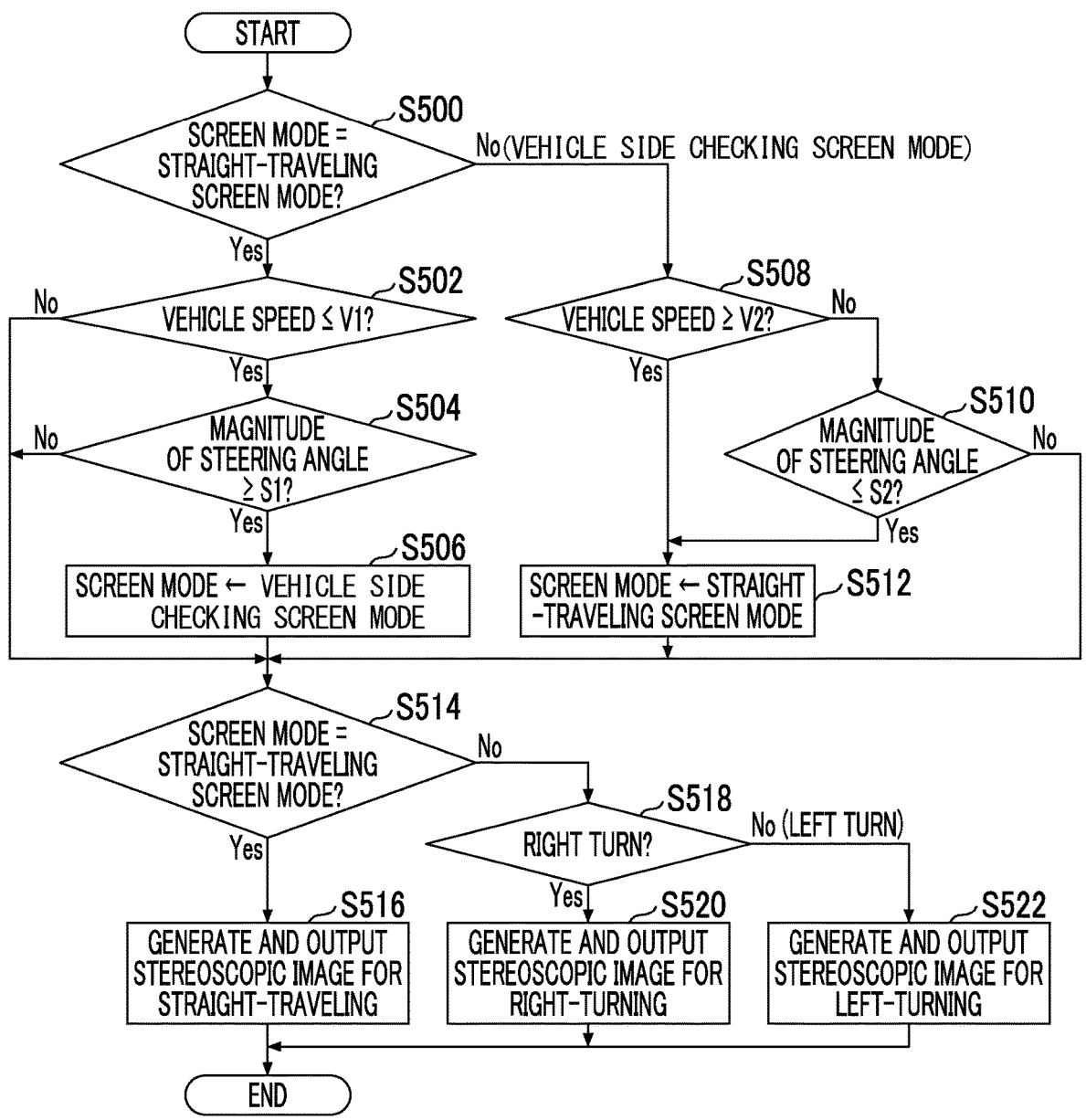
FIG. 5 is a flowchart schematically illustrating an example of a process executed by the control device.

FIG. 5 is a flowchart schematically illustrating an example of a process executed by the control device 40. The process illustrated in FIG. 5 is executed, for every predetermined cycle, while an ignition switch is turned on, a shift position is in a forward traveling range (a D range or the like), and a function of outputting a vehicle side checking screen is turned on.

In step S500, the display controller 44 determines whether a current screen mode is a straight-traveling screen mode. In FIG. 5, it is assumed that as the screen mode, there are two modes of the straight-traveling screen mode and a vehicle side checking screen mode, and the initial mode is the straight-traveling screen mode. In a case where the current screen mode is the straight-traveling screen mode, the process proceeds to step S502, and in a case where the current screen mode is not the straight-traveling screen mode (that is, the current screen mode is the vehicle side checking screen mode), the process proceeds to step S508.

In step S502, the display controller 44 determines whether the vehicle speed is equal to or less than a predetermined vehicle speed V1 based on the vehicle-speed information from the vehicle speed sensor 82. The predetermined vehicle speed V1 is a threshold value for detecting the turning state or the state before turning at a low speed, and is an adaptive value which is adapted through the experiments or the like. The predetermined vehicle speed V1 is about 10 km/h to 15 km/h, for example. In a case where the determination result is "YES", the process proceeds to step S504, and in a case where the determination result is "NO", the process proceeds to step S514.

In step S504, the display controller 44 determines whether the magnitude of the steering angle from the neutral position is equal to or greater than the predetermined angle S1 (for example, 180 degrees) based on the steering-angle information from the steering sensor 80. In a case where the determination result is "YES", the process proceeds to step S506, and in a case where the determination result is "NO", the process proceeds to step S514.

In step S506, the display controller 44 sets (switches) the screen mode to the vehicle side checking screen mode.

In step S508, the display controller 44 determines whether the vehicle speed is equal to or greater than a predetermined vehicle speed V2 based on the vehicle-speed information from the vehicle speed sensor 82. The predetermined vehicle speed V2 is a threshold value for detecting a state after turning, and is an adaptive value which is adapted through the experiments or the like. The predetermined vehicle speed V2 is equal to or greater than the predetermined vehicle speed V1, and is about 10 km/h to 15 km/h, for example. In a case where the determination result is "YES", the process proceeds to step S512, and in a case where the determination result is "NO", the process proceeds to step S510.

In step S510, the display controller 44 determines whether the magnitude of the steering angle from the neutral position is equal to or less than a predetermined angle S2 based on the steering-angle information from the steering sensor 80. The predetermined angle S2 is a threshold value for detecting a straight traveling state, is equal to or less than the predetermined angle S1, and is about 70 degrees to 110 degrees, for example. In a case where the determination result is "YES", the process proceeds to step S512, and in a case where the determination result is "NO", the process proceeds to step S514.

In step S512, the display controller 44 sets (switches) the screen mode to the straight-traveling screen mode.

In step S514, the display controller 44 determines whether the current screen mode is the straight-traveling screen mode. In a case where the current screen mode is the straight-traveling screen mode, the process proceeds to step S516, and in a case where the current screen mode is not the straight-traveling screen mode (that is, the current screen mode is the vehicle side checking screen mode), the process proceeds to step S518.

In step S516, the second stereoscopic image generation unit 42 generates the display image for straight-traveling. The display controller 44 provides an image signal corresponding to the display image for straight-traveling generated by the second stereoscopic image generation unit 42 to the display 83, and thus the display image for straight-traveling is displayed on the display 83.

In step S518, the display controller 44 determines whether steering-angle information represents a right turn based on the steering-angle information from the steering sensor 80. In a case where the steering-angle information represents a right turn, the process proceeds to step S520, and in a case where the steering-angle information does not represent a right turn (that is, the steering-angle information represents a left turn), the process proceeds to step S522.

In step S520, the first stereoscopic image generation unit 41 generates the display image for right-turning. The display controller 44 provides an image signal corresponding to the display image for right-turning generated by the first stereoscopic image generation unit 41 to the display 83, and thus the display image for right-turning is displayed on the display 83.

In step S522, the first stereoscopic image generation unit 41 generates the display image for left-turning. The display controller 44 provides an image signal corresponding to the display image for left-turning generated by the first stereoscopic image generation unit 41 to the display 83, and thus the display image for left-turning is displayed on the display 83.

According to the process illustrated in FIG. 5, in order to switch the screen mode to the vehicle side checking screen mode, the following three conditions (Condition 1 to Condition 3) relating to the traveling status are determined.

Condition 1: a vehicle speed being equal to or less than the predetermined vehicle speed V1

Condition 2: a magnitude of the steering angle being equal to or greater than the predetermined angle S1

Condition 3: a shift position being in the forward traveling range

According to the process illustrated in FIG. 5, in the straight-traveling screen mode, in a case where the traveling status is that the shift position is in the forward traveling range; the vehicle speed is equal to or less than the predetermined vehicle speed V1; and the magnitude of the steering angle is equal to or greater than the predetermined angle S1 (a combination of the three conditions, and an example of the predetermined first traveling status), the screen mode is switched to the vehicle side checking screen mode. In this manner, the display image for right-turning or the display image for left-turning can be generated and output at an occasion in which the usefulness of the safety checking for the area on either side of the host vehicle by the driver is relatively high.

In the process illustrated in FIG. 5, the turn signal lever information, the obstacle detection information from the distance measuring sensor 86, and the right or left turn point arrival trigger from the navigation device 87 are not used. Accordingly, in the configuration using the process illustrated in FIG. 5, the input of the turn signal lever information to the control device 40, the distance measuring sensor 86, and a function of outputting the point arrival trigger of the navigation device 87 may not be provided.

In addition, the process illustrated in FIG. 5 is executed while the function of outputting a vehicle side checking screen is turned on, but the disclosure is not limited thereto. Even while the function of outputting a vehicle side checking screen is turned off, the process from steps S500 to S522 may be executed on the background. However, since the process is executed on the background, the display image (the display image for right-turning, the display image for left-turning, or the like) is not output. In this case, at the time when the function of outputting a vehicle side checking screen is turned on, a state in which a navigation image is output can immediately be switched to a state in which the display image for right-turning, the display image for left-turning, or the like is output, and thus it is possible to advance the timing of starting the driving assistance.

Figure 6:
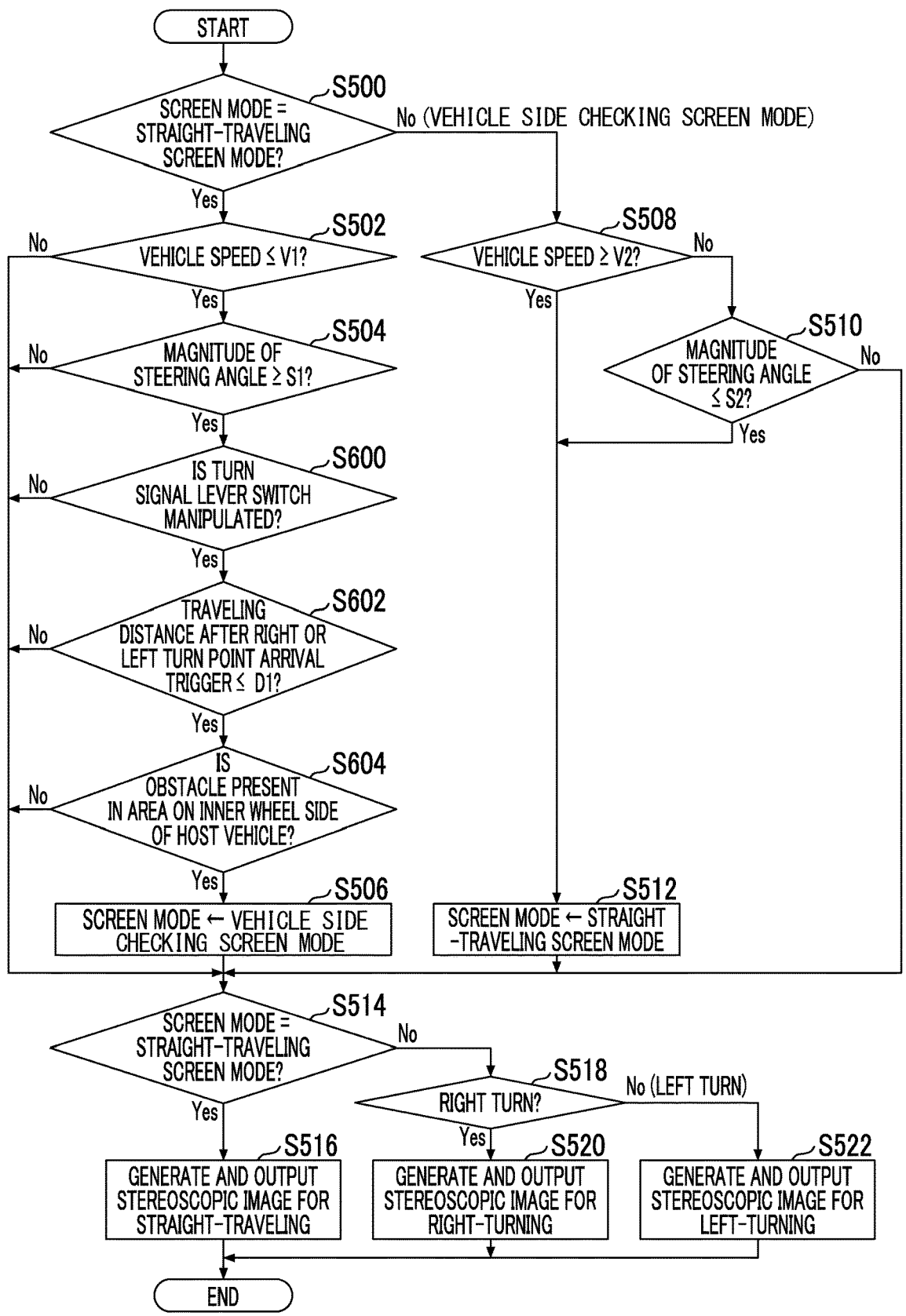
FIG. 6 is a flowchart schematically illustrating another example of a process executed by the control device.

FIG. 6 is a flowchart schematically illustrating another example of a process executed by the control device 40, and illustrates an alternative example of FIG. 5. The process illustrated in FIG. 6 is executed, for every predetermined cycle, while the ignition switch is turned on, the shift position is in the forward traveling range (the D range or the like), the distance measuring sensor 86 is turned on, and the function of outputting a vehicle side checking screen is turned on.

The process illustrated in FIG. 6 is different from the process illustrated in FIG. 5 in that steps S600 to S604 are added before step S506. Hereinafter, the different point will be described.

In step S600, the display controller 44 determines whether the turn signal lever switch 85 is manipulated (the manipulated state) based on the turn signal lever information from the turn signal lever switch 85. In a case where the determination result is "YES", the process proceeds to step S602, and in a case where the determination result is "NO", the process proceeds to step S514.

In step S602, the display controller 44 determines whether a traveling distance after the right or left turn point arrival trigger is received from the navigation device 87 is within a predetermined distance D1. The predetermined distance D1 corresponds to a traveling distance from when the right or left turn point arrival trigger is received to when the vehicle starts to turn right or left, and is an adaptive value which is adapted depending on the accuracy or the like of the positional information of the host vehicle from the GPS receiver 81. In a case where the determination result is "YES", the process proceeds to step S604, and in a case where the determination result is "NO", the process proceeds to step S514. In a case where the right or left turn point arrival trigger is not received from the navigation device 87, the determination result is "NO", and the process proceeds to step S514. However, in a modification example, since the display image for right-turning or the display image for left-turning can be output while the guidance by the navigation device 87 is not performed, in a case where the right or left turn point arrival trigger is not received from the navigation device 87, the process may proceed to step S604.

In step S604, the display controller 44 determines whether an obstacle is present in the area on the inner wheel side of the host vehicle based on the obstacle detection information from the distance measuring sensor 86. For example, in a case of a left turn, the inner wheel side is the left side, and the display controller 44 determines whether an obstacle is present in the area on the inner wheel side of the host vehicle based on the presence or absence of the obstacle detection information from the left distance measuring sensor 86. In a case where the determination result is "YES", the process proceeds to step S506, and in a case where the determination result is "NO", the process proceeds to step S514.

According to the process illustrated in FIG. 6, in order to switch the screen mode to the vehicle side checking screen mode, in addition to Conditions 1 to 3 relating to the traveling status, the following Condition 4 relating to the traveling status is determined.

Condition 4: a host vehicle approaching or arriving at the right or left turn point relating to the right or left turn point arrival trigger (the traveling distance after the right or left turn point arrival trigger is received from the navigation device 87 being within the predetermined distance D1)

That is, according to the process illustrated in FIG. 6, in the straight-traveling screen mode, in a case where the shift position is in the forward traveling range; the vehicle speed is equal to or less than the predetermined vehicle speed V1; the magnitude of the steering angle is equal to or greater than the predetermined angle S1; and the traveling distance after the right or left turn point arrival trigger is received from the navigation device 87 is within the predetermined distance D1 (a combination of the four conditions, and an example of the predetermined first traveling status), the screen mode is switched to the vehicle side checking screen mode. Such a state is highly possibly the turning state accompanied by the right or left turn or the state before turning, and can be an occasion in which the usefulness of the safety checking for the area on either side of the host vehicle by the driver is high.

According to the process illustrated in FIG. 6, in addition to the above-described four conditions (Conditions 1 to 4), the following Condition 5 is determined.

Condition 5: the manipulated state of the turn signal lever being detected

The manipulated state of the turn signal lever is highly possibly the turning state or the state before turning (for example, waiting for right or left turn at an intersection), and can be an occasion in which the usefulness of the safety checking for the area on either side of the host vehicle by the driver is relatively high. Accordingly, according to the process illustrated in FIG. 6, the turning state accompanied by the right or left turn or the state before turning can be accurately detected by Conditions 4 and 5 being determined, and in the turning state accompanied by the right or left turn or the state before turning, the display image for right-turning or the display image for left-turning can be generated and output.

According to the process illustrated in FIG. 6, in addition to the above-described five conditions (Conditions 1 to 5), the following Condition 6 relating to a periphery status of the host vehicle is determined.

Condition 6: an obstacle being present in the area on the inner wheel side of the host vehicle (an example of a predetermined periphery status)

The state in which an obstacle is present in the area on the inner wheel side of the host vehicle can be an occasion in which the usefulness of the safety checking for the area on either side of the host vehicle by the driver is relatively high. Accordingly, according to the process illustrated in FIG. 6, in the turning state accompanied by the right or left turn or the state before turning, in a case where an obstacle that is useful for being recognized by the driver, is present in the area on either side of the host vehicle, the display image for right-turning or the display image for left-turning can be generated and output.

In the process illustrated in FIG. 6, in a case where all of Conditions 1 to 6 are satisfied, the screen mode is switched to the vehicle side checking screen mode, but the disclosure is not limited thereto. For example, Condition 5 and/or Condition 6 may be omitted. In addition, in Conditions 1 to 4, only some combinations of Conditions 1 to 4 may be used, and Condition 1, Condition 2, and Condition 4 may solely be used. For example, since the state relating to Condition 1 (the state in which the vehicle speed is equal to or less than the predetermined vehicle speed V1) is at a low vehicle speed, the state relating to Condition 1 can be an occasion in which the usefulness of the safety checking for the area on either side of the host vehicle by the driver is relatively high. In addition, examples of the some combinations of Conditions 1 to 4 include a combination of Condition 1, Condition 2, and Condition 3, a combination of Condition 2, and Condition 3, a combination of Condition 2, Condition 3, and Condition 4, and a combination of Condition 3, and Condition 4.

Regarding Condition 3, in the process illustrated in FIG. 5 (the same applies to FIG. 6), in a case where the host vehicle is in a forward traveling state, or in a stopped state with the shift position being in the forward traveling range, the display image (the display image for right-turning, the display image for left-turning, or the like) is output, but the disclosure is not limited thereto. For example, in a case where the host vehicle is in a backward traveling state or in a stopped state with the shift position being in a backward traveling range (that is, an R range), the display image for right-turning or the display image for left-turning may be output. For example, the process illustrated in FIG. 5 may be executed regardless of the range of the shift position (that is, Condition 3 may be omitted). In the modification example, as another modification example, in the process illustrated in FIG. 5, in a case where the shift position is in the backward traveling range, instead of the display image for right-turning, the display image for left-turning, and the display image for straight-traveling which are described above, another display image for right-turning, another display image for left-turning, and another display image for straight-traveling may be generated and output. In this case, the other display image for right-turning includes another stereoscopic image section for right-turning (an example of the first display image); the other display image for left-turning includes another stereoscopic image section for left-turning (an example of the first display image); and the other display image for straight-traveling includes another stereoscopic image section for straight-traveling (an example of the second display image). In this case, a viewpoint of the other stereoscopic image section for right-turning is reversed in a front-rear direction and a right-left direction with respect to the stereoscopic image section for right-turning 60; a viewpoint of the other stereoscopic image section for left-turning is reversed in a front-rear direction and a right-left direction with respect to the stereoscopic image section for left-turning 50; and a view point of the other stereoscopic image section for straight-traveling is reversed in a front-rear direction with respect to the stereoscopic image section for straight-traveling 70. For example, the viewpoint of the other stereoscopic image section for left-turning is a viewpoint (an example of the first predetermined viewpoint) from which the right side surface and the front portion of the host vehicle are obliquely seen from above. The viewpoint of the other stereoscopic image section for right-turning is a viewpoint (an example of the first predetermined viewpoint) from which the left side surface and the front portion of the host vehicle are obliquely seen from above. In this manner, in the left turning state accompanied by parking or the like or the state before left turning, the occupant can check the safety of the outer wheel side by looking at the other stereoscopic image section for left-turning. In addition, in the right turning state accompanied by parking or the like or the state before right turning, the occupant can check the safety of the outer wheel side by looking at the other stereoscopic image section for right-turning. In a case where the shift position is in the backward traveling range, the other stereoscopic image section for left-turning or the like may be output together with a vehicle rear-side image in which a portion rearward of the host vehicle is projected.

In the embodiment, the first stereoscopic image generation unit 41, the second stereoscopic image generation unit 42, and the display controller 44 are an example of "the electronic control unit".

The embodiments are described above, but the disclosure is not limited to a specific embodiment, and various modifications and changes can be made within the scope of the disclosures. In addition, all or a plurality of constituent elements of the above-described embodiments can be combined.

For example, in the above-described embodiment, in a case where the traveling status is any of the right turning state, the state before right turning, the left turning state, and the state before left turning, a display image for turning (the display image for right-turning or the display image for left-turning) is generated and output, but the disclosure is not limited thereto. For example, in a case where the traveling status is the right turning state or the state before right turning, the display image for right-turning is generated and output, but in a case where the traveling status is the left turning state or the state before left turning, the display image for left-turning may not be generated and output. Such a configuration is preferable in a country in which a vehicle travels on the right lane, for example. Reversely, in a case where the traveling status is the left turning state or the state before left turning, the display image for left-turning is generated and output, but in a case where the traveling status is the right turning state or the state before right turning, the display image for right-turning may not be generated and output. Such a configuration is preferable in a country in which a vehicle travels on the left lane.

In the above-described embodiment, in the predetermined traveling status, the display image for right-turning or the display image for left-turning is generated and output, but the disclosure is not limited thereto. Instead of the predetermined traveling status, in the predetermined periphery status of the area on either side of the host vehicle, the display image for right-turning or the display image for left-turning may be generated and output. The predetermined periphery status includes a state in which an obstacle is present in the area on the inner wheel side of the host vehicle, that is, a state in which an obstacle is detected by the distance measuring sensor 86. As described in relation to Condition 6, such a state can be an occasion in which the usefulness of the safety checking for the area on either side of the host vehicle by the driver is relatively high. In this case, among the display image for left-turning and the display image for right-turning, a stereoscopic image relating to a direction in which an obstacle is present may be generated and output. For example, in a case where an obstacle is detected by the left distance measuring sensor 86, the display image for left-turning may be generated and output. Even in the modification example, at an occasion in which the usefulness of the safety checking for the area on either side of the host vehicle by the driver is relatively high, the display image for right-turning or the display image for left-turning can be generated and output. That is, it is possible to output a display image by which the occupant more easily recognizes the area on either side of the host vehicle, at an appropriate occasion.

In the above-described embodiment, in the predetermined traveling status, the display image for right-turning or the display image for left-turning is generated and output, but the disclosure is not limited thereto. Instead of the predetermined traveling status, in the manipulated state of turn signal lever, the display image for right-turning or the display image for left-turning may be generated and output. As described in relation to Condition 5, such a state can be an occasion in which the usefulness of the safety checking for the area on either side of the host vehicle by the driver is relatively high. In the modification example, even when the vehicle is not in the steering state in which the magnitude of the steering angle from the neutral position is equal to or greater than the predetermined angle S1, in the manipulated state of the turn signal lever, the display image for right-turning or the display image for left-turning can be generated and output. For example, in case of a "state before lane change", the vehicle is not in the steering state in which the magnitude of the steering angle from the neutral position is equal to or greater than the predetermined angle S1, but the "state before lane change" can be an occasion in which the usefulness of the safety checking for the area on either side of the host vehicle by the driver is relatively high. For example, in a case where the manipulated state of the turn signal lever indicates a possibility of lane change to the left lane, the display image for left-turning may be generated and output. Accordingly, the occupant can more easily recognize a status of the area on the side of the host vehicle which is on the lane side of the change destination, before the lane change.

In the above-described embodiment, an obstacle is detected by using ultrasonic waves (the distance measuring sensor 86), but the disclosure is not limited thereto. For example, an obstacle may be detected by using millimeter waves or laser light. An obstacle may be detected by an image recognition process with respect to the image of the camera 90.

In the above-described embodiment, each of the viewpoint for left-turning and viewpoint for right-turning is constant, but the disclosure is not limited thereto. For example, each of the viewpoint for left-turning and the viewpoint for right-turning may be changed according to the magnitude of the steering angle from the neutral position. For example, the viewpoint for left-turning may be variable such that the viewpoint is moved leftward as the magnitude of the steering angle from the neutral position to the left direction is increased.

In the above-described embodiment, the second stereoscopic image generation unit 42 is provided, but the second stereoscopic image generation unit 42 may not be provided. In this case, there is no straight-traveling screen mode, and in the process illustrated in FIG. 5, a mode of displaying a navigation image may be used instead of the straight-traveling screen mode.

What is claimed is:

1. A vehicle periphery monitoring apparatus comprising:
a camera configured to image an external environment of a vehicle periphery of a host vehicle;
an electronic control unit comprising a processor and associated memory; and
a display provided within the host vehicle and configured to display a display image,
wherein the electronic control unit is configured to
generate the display image of the external environment based on image information received from the camera such that the display image includes a first display image from a first predetermined viewpoint that is located to one of right and left sides of the host vehicle and from which a corresponding one of right and left side surfaces of the host vehicle and a rear portion or a front portion of the host vehicle are obliquely seen from above,
generate and output the display image including the first display image in at least a first traveling status of the host vehicle that includes a steering state in which a magnitude of a steering angle from a neutral position is equal to or greater than a predetermined angle, the predetermined angle being separated from the neutral position by a range of magnitudes of the steering angle,
the first traveling status further includes a vehicle speed state in which a vehicle speed of the host vehicle is equal to or less than a predetermined vehicle speed,
the predetermined angle is a first predetermined angle and the predetermined vehicle speed is a first predetermined vehicle speed; and
the electronic control unit is further configured to discontinue the generation and output of the display image including the first display image if (i) the vehicle speed of the host vehicle is greater than or equal to a second predetermined vehicle speed and (ii) the magnitude of the steering angle from the neutral position is less than or equal to a second predetermined angle that is different from the first predetermined angle.

2. The vehicle periphery monitoring apparatus according to claim 1, wherein the electronic control unit is configured to determine whether the vehicle speed of the host vehicle is equal to or less than the predetermined vehicle speed based on obtained vehicle-speed information.

3. The vehicle periphery monitoring apparatus according to claim 1, wherein:
the first traveling status further includes a state in which a shift position of the host vehicle is in a forward traveling range; and
from the first predetermined viewpoint, a side surface on an inner wheel side of the right and left side surfaces of the host vehicle and the rear portion of the host vehicle are obliquely seen from above.

4. The vehicle periphery monitoring apparatus according to claim 3, wherein the first traveling status further includes a state in which the host vehicle approaches or arrives at a predetermined left turn point or right turn point.

5. The vehicle periphery monitoring apparatus according to claim 1, wherein:
the electronic control unit is further configured to generate and output the display image including the first display image in the first traveling status and in a predetermined periphery status of an area on either of the left and right sides of the host vehicle;
the predetermined periphery status includes a state in which a detected obstacle is present in the area on either side of the vehicle.

6. The vehicle periphery monitoring apparatus according to claim 1, wherein the electronic control unit is configured to
generate the display image such that the display image further includes a second display image from a second predetermined viewpoint from which the host vehicle is seen from behind and obliquely from above in a right-left symmetry manner, and
generate and output the display image including the second display image in a predetermined second traveling status including a straight traveling state.

7. The vehicle periphery monitoring apparatus according to claim 1,
wherein the electronic control unit is further configured to generate and output the display image including the first display image in at least one of (i) a predetermined periphery status of an area on either of the left and right sides of the host vehicle and (ii) a state in which a turn signal lever is manipulated.

* * * * *